Nov. 9, 1937.  H. E. WEAVER  2,098,325
MEASURING APPARATUS
Filed June 29, 1934
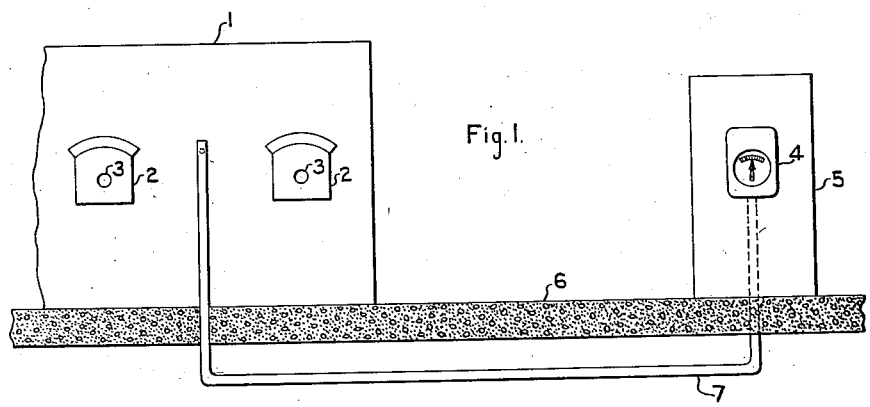
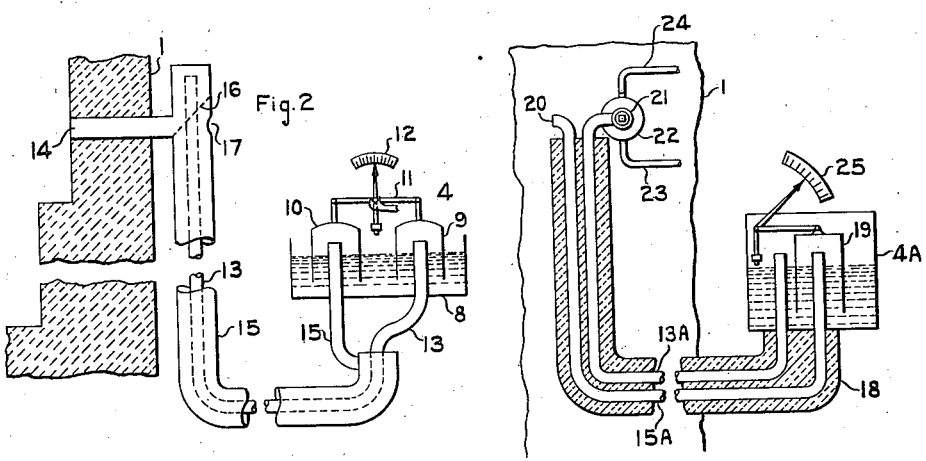
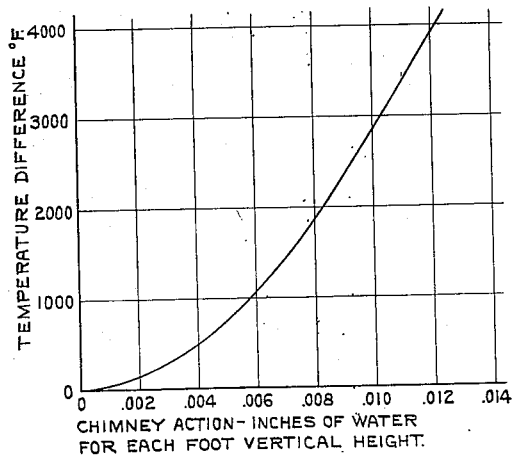
INVENTOR
Harry E. Weaver
BY
Raymond D. Junkins
ATTORNEY Patented Nov. 9, 1937

2,098,325

UNITED STATES PATENT OFFICE 2,098,325

MEASURING APPARATUS

Harry E. Weaver, South Euclid, Ohio, assignor to Bailey Meter Company, a corporation of Delaware Application June 29, 1934, Serial No. 733,065

7 Claims. (Cl. 73—31)

This invention relates to measuring apparatus for determining the pressure within furnaces, kilns, ovens, etc. or, in fact, any type of heated enclosure. The value of the pressure determined by the measuring apparatus may be visually indicated or recorded, or used in connection with control apparatus.

The atmosphere adjacent a furnace, or other heated enclosure, is usually at a relatively high temperature compared to the temperature of the atmosphere at a distance from the furnace, due to the transmission of heat through the walls. Measuring apparatus is usually placed at a distance from the furnace and, therefore, subjected to what might be termed normal atmospheric conditions. However, the pipe, or pipes, connecting the measuring apparatus with the furnace must pass through a zone of abnormally high temperature adjacent the exterior wall of the furnace, and the air within the pipe, or pipes, is therefore subjected to abnormal conditions. As hereinafter more fully explained, there is present an error due to the fact that the connecting piping is subjected to various temperatures and it is, therefore, a primary object of my invention to provide an arrangement which is unaffected by variations in ambient atmospheric conditions, which may be not only temperature but pressure, air velocity, or other variable conditions of the atmosphere.

Another object of the invention is to provide measuring apparatus wherein the pressure or pressure difference between the interior of a furnace and the atmosphere exterior of the furnace at the same elevation is determined.

Further objects will become apparent from the description to follow and from the drawing, in which:

Fig. 1 illustrates somewhat diagrammatically, in elevation, an installation of measuring apparatus in connection with an open hearth furnace.

Fig. 2 is a diagrammatic elevation of the arrangement of Fig. 1 in greater detail.

Fig. 3 illustrates diagrammatically another embodiment of the invention.

Fig. 4 is a graph from which may be read the magnitude of the difference in pressure per foot of vertical height produced by various temperature differences.

I have chosen to illustrate and describe my invention in connection with an open hearth furnace, although it will be understood that this is merely a preferred embodiment and that I am not to be limited thereby. Referring, first, to Fig. 1, I show therein an open hearth furnace 1 provided with the usual charging doors 2 and wickets 3. The measuring apparatus 4 for determining and visually advising the pressure within the furnace 1, is illustrated as being located upon a panel board 5 at some little distance from the furnace 1 and may be at a location wherein the ambient temperature is considerably different from the temperature immediately adjacent the exterior of the furnace 1.

Due to the fact that the charging floor 6 is in continual use and cannot be obstructed, it is advisable to run the connecting piping 7 between the pressure gage 4 and the wall of the furnace 1 vertically downward from each and then below the floor 6, as clearly illustrated.

Furnaces of this type are usually operated at a temperature in the neighborhood of 3000° F. The temperature exterior of the wall of the furnace will vary from, for example, 300° F. to 1000° F., dependent upon the condition of the furnace wall, although it will be understood that these figures are representative only and not to be interpreted as exact values. The temperature of the atmosphere immediately surrounding the furnace may also be subject to frequent and violent fluctuations caused by the opening and closing of the charging doors, or by the fact that such furnaces are frequently located in poorly constructed or substantially open buildings and the ambient temperature may, therefore, be influenced by the outside air temperature, wind velocities, etc. It is apparent, therefore, that that portion of the piping 7 running vertically downward along the exterior wall of the furnace 1, may be subjected to relatively high temperatures, and the air column within the piping will likewise be heated or cooled through widely varying limits.

At the same time, the air surrounding the pressure gage 4 and its vertical section of piping may be at any temperature, but probably at a temperature considerably cooler than that surrounding the furnace 1. The pressure gage 4 will, thus, be subjected to what is known as "chimney action" wherein the pressure transmitted through the piping 7 will not be the true pressure within the furnace 1 but will be in error due to the temperature differences within the various portion of the piping 7. It is well known that columns of gas within a pipe or chimney at a temperature higher than the temperature surrounding all or a portion of the pipe or chimney, will tend to rise. This effect is numerically shown on the graph of Fig. 4, wherein the chimney action is plotted in values of inches of water for each foot vertical height at different values of temperature difference. Specifically, "chimney action" may be defined as the pressure difference existing at any given elevations between two vertical columns of gases caused by a difference in their densities resulting from a difference in their temperatures.

The above referred to errors in indicating at the pressure gage 4 the true pressure within the furnace 1, are on the assumption of a single pipe connecting the furnace 1 with the pressure gage 4. It is a primary object of my invention to eliminate such errors in the measuring apparatus and I do this in preferred manner by differentially measuring the pressure internal and external the furnace 1 at the same elevation.

To accomplish such results, I illustrate at Fig. 2 and Fig. 3 respectively two preferred arrangements for carrying to the pressure gage 4 pressure internal the furnace and external the furnace at the same elevation, wherein each such pressure is subjected to the same change due to variations in temperature of the pressure transmitting fluid and, therefore, the errors which otherwise would be present in the measurement are cancelled out, and the result is a true and accurate measurement of the pressure within the furnace relative to the atmosphere adjacent the furnace.

It will be understood that a principal object in measuring the pressure within such a furnace is to control the operation of the furnace and to prevent blowing gas and flame out of the wickets and other openings which may exist in the wall of the furnace, or to prevent excessive infiltration of air into the furnace. It is usually preferable, therefore, to have at some point of elevation within the furnace, what is known as a balanced draft condition wherein the pressure at that elevation is the same as that at the same elevation external to the furnace. It may be that within the furnace at a slightly greater elevation there will exist a slight positive pressure, while at a lower elevation there may exist a slight negative pressure. The point of connection for the pressure piping through the wall of the furnace may be at the elevation where it is desired to maintain a balanced draft condition within the furnace, or at any other location as desired, but my preferred arrangement is such that the measurement by the pressure gage 4 will be an accurate measurement of the pressure existing within the furnace at the elevation of the connection to the interior of the furnace and relative to the pressure of the atmosphere adjacent the exterior of the furnace at the same elevation.

In Fig. 2, I illustrate diagrammatically but in somewhat more detail than Fig. 1, the preferred embodiment of my invention wherein the pressure gage comprises a container 8 in which are positioned liquid sealed bells 9, 10 pivotally suspended from a fulcrumed beam 11 which carries a pointer adapted to be moved relative to an index 12 for visually advising the position of the bells and beam 11.

From beneath the bell 9 I lead a pressure pipe 13 to a point adjacent the wall of the furnace 1 and communicating with the interior of the furnace through a pipe 14. From beneath the bell 10 I show a pipe 15 which surrounds the pipe 13 throughout its length from the pressure gage 4 to adjacent the furnace 1.

Adjacent the pressure gage 4 the pipe 15 is sealed around the pipe 13, while adjacent the furnace 1, it is sealed by a partition 16 from the open end of the pipe 13 and also from the pipe 14, while being in communication with the atmosphere at the same elevation as the pipe 14 through an opening 17 in the wall of the pipe 15. The arrangement is such that the pipe 13 extends vertically upward through the partition 16 to an elevation slightly greater than that of the pipe 14, so that soot, ashes, etc. from the furnace do not tend to enter the pipe 13. The pipe 15 is capped above the open end of the pipe 13 adjacent the furnace wall.

It will be seen that pressure within the furnace at the elevation of the pipe 14 is effective through the pipe 14 and the pipe 13 upon the liquid sealed bell 9, while pressure at the same elevation but exterior the furnace is effective through the opening 17 and the pipe 15 upon the under side of the liquid sealed bell 10.

If the pressure effective upon the bells 9 and 10 is the same, then it is apparent that a balanced pressure condition exists between the interior and the exterior of the furnace at the elevation of the connecting pipe 14. If, however, the pressure within the furnace is greater or less than that of the atmosphere at the same elevation exterior to the furnace, then such pressure differences will be measured by the relative position of the liquid sealed bells 9, 10 and visually indicated upon the index 12.

Inasmuch as the pipes 13, 15 contain, throughout their length, columns of air at substantially the same temperature, then any effect of chimney action upon such columns of air will be the same in both pipes and applied in equal amounts to both the bells 9 and 10, and therefore cancel out or become inconsequential in the measurement of the pressure within the furnace.

My invention therefore comprises an arrangement for compensating a pressure gage for errors which might otherwise result due to the gage being located at a distance from the point of connection of the pressure transmitting pipe to the interior of the furnace, for as shown, I have disclosed a means for determining the difference in pressure existing within the furnace and that existing exterior thereof, at a point immediately adjacent the connection to the interior of the furnace.

In Fig. 3 I illustrate an embodiment wherein the two pipes 13A and 15A are not enclosed the one in the other, but are carried, between the location of the pressure gage 4A and the point of connection to the furnace 1, adjacent each other and lagged by lagging 18, to insure that the air columns within the two pipes are maintained at substantially the same temperature.

The pipe 15A leading to the interior of a liquid sealed bell 19 is open at 20 to the atmosphere at the same elevation as the pipe 21 which joins the pipe 13A with the interior of the furnace. The pipe 21 is shown as having a plug which may be removed for observation to see that the pipe is clear for pressure transmittal or to clear it of soot or dust. Furthermore, I surround the pipe 21 with a water jacket 22 having water supply and drainage lines 23, 24.

At the pressure gage 4A, the liquid seal container is made as a pressure tight casing having a single liquid sealed bell 19 adapted to receive within the bell the pressure of the atmosphere at 20, and exterior of the bell, the pressure within the furnace at the elevation of the pipe 21. The differential in pressure applied to the interior and exterior of the bell 19 positions the bell vertically, and through proper levers and pressure tight bearings, the position of the bell is indicated external of the casing 4A relative to the index 25.

It will be appreciated that some radiant heat will pass through a pipe 21, and the water cooling jacket serves to absorb some of this heat. Furthermore, the pipe 13A passes for a short distance horizontally at the elevation of the pipe 21 before joining the pipe 21, so that there is no direct action of radiation through the pipe 21 upon a vertical column of gas in the transmitting pipe 13A. The horizontal run between the pipe 13A and the pipe 21 may be in the nature of 12 to 20 inches, or whatever is required to provide a volume of gas sufficient to take the maximum movement of the bell 19 before such movement of gas within the connecting piping would draw any of the excessively heated gas from the pipe 21 into a vertical section of the piping 13A, and thus momentarily at least, produce a false pressure reading before the vertical section came back to substantially the same temperature as the corresponding vertical section of the piping 15A.

While in the foregoing description for the sake of simplicity and clearness I have used specific temperatures and pressures, it is to be understood that my invention is not to be limited thereby, as the invention may readily be utilized for a wide range of temperatures and pressures and with other types of furnaces; nor is it necessarily limited to heated enclosures such as furnaces, but may be advantageously applied to determine the pressure existing within any enclosure through the elimination of local atmospheric disturbances upon the accuracy of the pressure gage.

While I have chosen to illustrate and describe certain preferred embodiments of my invention, I am not to be limited thereby but only as to the claims in view of prior art.

What I claim as new, and desire to secure by Letters Patent of the United States, is:

1. In combination, an enclosed structure, a pressure gage for determining the pressure within said structure, a connection between said gage and the interior of said structure, and a connection between said gage and the atmosphere at the exterior of said structure, one of said connections surrounding the other throughout substantially its entire length, said gage sensitive to the difference in the pressures within said connections.

2. A pressure gage for determining the difference in pressures existing between the atmosphere and an enclosure which is at a substantially different temperature than that of the atmosphere and wherein the gage is located at a different elevation than the point of connection into the enclosure, comprising in combination, a connection between the gage and the interior of said structure, and a connection between the gage and the atmosphere at the exterior of said structure at the same elevation, one of said connections surrounding the other throughout substantially its entire length, said gage sensitive to the difference in the pressures within said connections.

3. In combination, an enclosed structure, a pressure gage for determining the pressure within said structure, a connection between said gage and the interior of said structure, and a pipe surrounding said connection and providing a passageway for a pressure transmitting fluid between the pressure gage and the atmosphere at the exterior of said structure, said gage responsive to the difference in pressure between the atmosphere and that within said connection.

4. A pressure gage for determining the difference in pressures existing between the atmosphere and an enclosure which is at a substantially different temperature than that of the atmosphere and wherein the gage is located at a different elevation than the point of connection into the enclosure, comprising in combination, a connection between the gage and the interior of said structure, and a connection between the gage and the atmosphere at the exterior of said structure at the same elevation, said connections being adjacent each other throughout substantially their entire lengths, said gage sensitive to the difference in the pressures within said connections.

5. In combination, an enclosed structure, measuring apparatus for determining the pressure within said structure, a pipe connection between said apparatus and the interior of said structure, a pipe connection between said apparatus and the atmosphere at the exterior of said structure, means for maintaining said pipe connections at substantially the same temperature, said apparatus responsive to the differences in the pressures within said connections.

6. In combination, an open-hearth furnace, a sleeve through a wall of said furnace, a draft gage for determining the draft within said furnace, a pipe between said gage and the exterior wall of said furnace extending above said sleeve, and a connection joining said sleeve and pipe comprising a hood completely encircling the section of said pipe extending above said sleeve.

7. A pressure gage for determining the difference in pressures existing between the atmosphere and an enclosure wherein the gage is located at a distance from the point of connection into the enclosure comprising in combination, a connection between the gage and the interior of said structure, and a connection between the gage and the exterior of said structure at the same elevation, said connections being adjacent each other throughout substantially their entire lengths, said gage sensitive to the difference in the pressures within said connections.

HARRY E. WEAVER.